United States Patent
Lohberg et al.

(10) Patent No.: US 7,167,785 B2
(45) Date of Patent: Jan. 23, 2007

(54) SYSTEM AND DEVICE FOR DETECTING YAW DISPLACEMENTS USING STAND-BY MEASURING CHANNELS

(75) Inventors: Peter Lohberg, Friedrichsdorf (DE); Roland Burghardt, Frankfurt (DE); Michael Zydek, Frankfurt (DE)

(73) Assignee: Continental Teves, AG and Company, oHG, Frankfurt (DE)

( * ) Notice: Subject to any disclaimer, the term of this patent is extended or adjusted under 35 U.S.C. 154(b) by 26 days.

(21) Appl. No.: 10/221,098

(22) PCT Filed: Mar. 2, 2001

(86) PCT No.: PCT/EP01/02374

§ 371 (c)(1),
(2), (4) Date: Sep. 6, 2002

(87) PCT Pub. No.: WO01/66395

PCT Pub. Date: Sep. 13, 2001

(65) Prior Publication Data
US 2003/0055550 A1    Mar. 20, 2003

(30) Foreign Application Priority Data
Mar. 9, 2000 (DE) ............................... 100 11 116
Aug. 18, 2000 (DE) ............................... 100 40 511

(51) Int. Cl.
*G06F 19/00* (2006.01)

(52) U.S. Cl. ..................................................... 701/34

(58) Field of Classification Search ................... 701/1, 701/34, 36, 39, 63, 92; 702/57–59, 85, 92–93; 73/503.3, 504.03, 508
See application file for complete search history.

(56) References Cited

U.S. PATENT DOCUMENTS

| 4,105,900 | A |   | 8/1978  | Martin et al. |
| 4,914,598 | A | * | 4/1990  | Krogmann et al. ........... 701/11 |
| 5,207,483 | A |   | 5/1993  | Shimada et al. |
| 5,222,065 | A | * | 6/1993  | Krogmann .................... 714/38 |
| 5,531,115 | A | * | 7/1996  | Erdley ...................... 73/504.02 |
| 6,278,379 | B1 | * | 8/2001 | Allen et al. ............ 340/870.16 |
| 6,317,674 | B1 | * | 11/2001 | Lohberg et al. ............... 701/72 |

(Continued)

FOREIGN PATENT DOCUMENTS

DE    44 16 803    11/1994

(Continued)

OTHER PUBLICATIONS

Search Report of the German Patent Office for Appln. 10040511.8.

*Primary Examiner*—Thu V. Nguyen

(57) ABSTRACT

The present invention relates to a system for detecting safety-critical measured quantities, in particular yaw rates or acceleration data in automotive vehicles, comprising at least two independent measuring channels with sensors that are independent of one another and elements for verifying a malfunction or a failure of the measuring channels. The first measuring channel and the additional measuring channel(s) are operated in hot redundancy employing sensors of the similar type but not exactly identical in such a manner that the sensors are operated in parallel and without restriction. This invention also relates to a device consisting of a sealed housing with a plug, and the aforementioned system is accommodated in the sealed housing.

14 Claims, 2 Drawing Sheets

U.S. PATENT DOCUMENTS 6,396,163 B1 * 5/2002 Sugiura et al. ............. 307/9.1

FOREIGN PATENT DOCUMENTS

| | | |
|---|---|---|
| DE | 195 25 217 | 1/1997 |
| DE | 196 21 320 | 12/1997 |
| DE | 198 16 978 | 11/1999 |
| DE | 199 21 692 | 5/2000 |

* cited by examiner

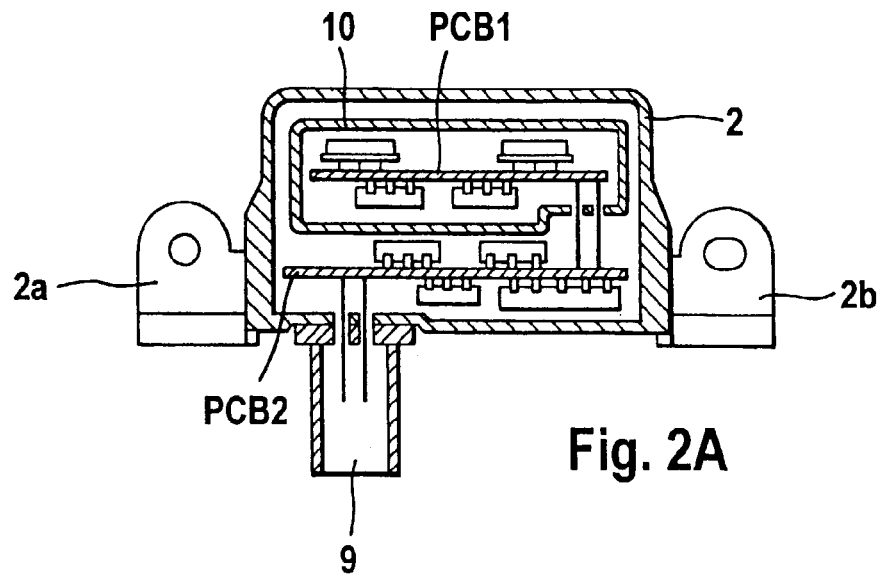
Fig. 2A
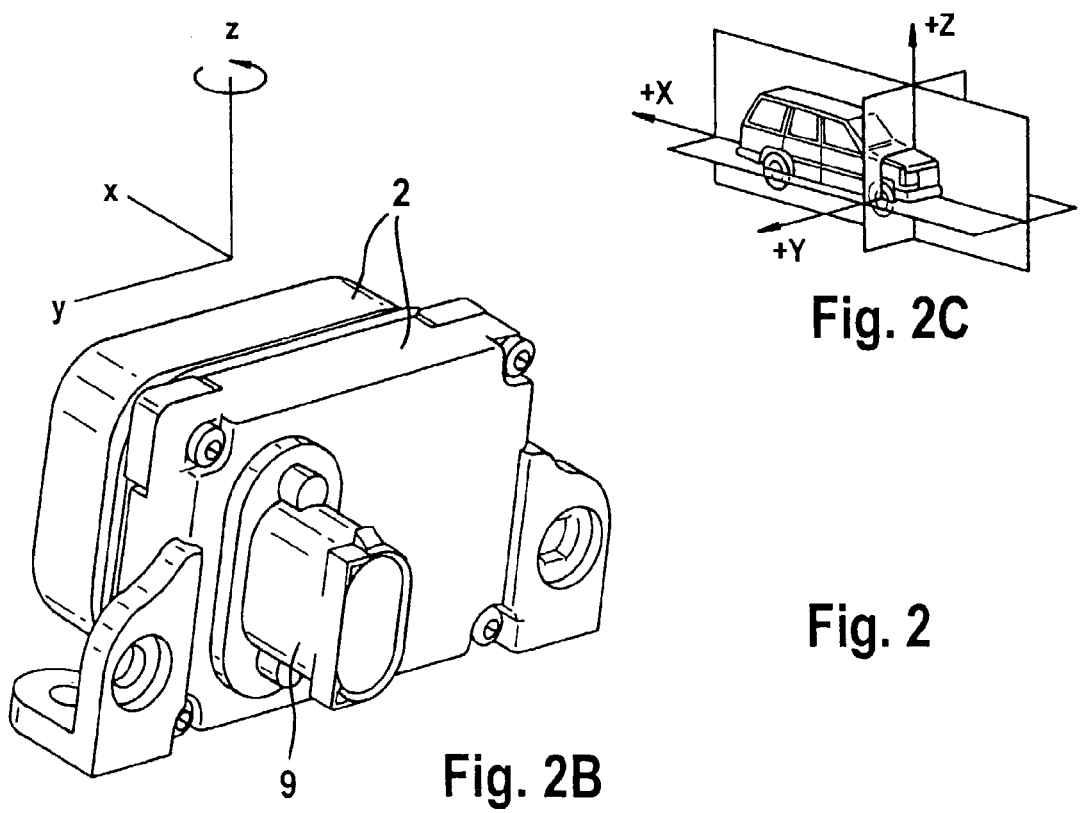
Fig. 2B
Fig. 2C
Fig. 2

SYSTEM AND DEVICE FOR DETECTING YAW DISPLACEMENTS USING STAND-BY MEASURING CHANNELS

TECHNICAL FIELD

The present invention generally relates to yaw angle detection systems and more particularly relates to a method and apparatus for improving the robustness of a yaw angle detection system.

BACKGROUND OF THE INVENTION

Driving stability control systems (ESP) for governing and limiting undesirable yaw movements about the vertical axis are known in the art. Essential quantities that can be varied deliberately by the driver are measured by means of sensors whereby to calculate a nominal yaw rate. The quantities refer to the steering angle, the accelerator pedal position, the braking pressure, the transverse acceleration, and the rotational behavior of the individual vehicle wheels. In addition, the actual value of the yaw rate developing as a reaction to the driving maneuver is measured using a yaw rate sensor. If the actual value of the yaw movement differs from the calculated nominal value by a predetermined amount jeopardizing driving stability, the yaw movement is limited to allowable values by a specified brake and engine intervention.

This demands a high degree of functional safety from the sensors because their malfunctions may effect, under certain circumstances, braking actions or a neutralization of braking effects at a wrong point of time, thereby potentially triggering dangerous situations. This is especially applicable to a yaw rate sensor in which a moderate exceeding of allowable drift tolerances for accuracy and precision may cause undesirable control actions. Although the effect of the control actions is governed by using other auxiliary variables, causalities, or plausibility criteria, the major endeavor of the automotive industry is to increase the inherent safety of yaw rate sensors so that undesirable control actions, caused by faulty yaw rate sensors, can be prevented reliably even without other auxiliary quantities, causalities, or plausibility criteria. State of the art yaw rate sensors for automotive vehicles provide a high degree of inherent safety and are designed such that a defined total failure becomes apparent in the majority of cases. However, there is still some likelihood that possible, slowly proceeding defects will not be detected. Such defects can be the result of faulty capacitors, open high-ohmic semiconductor inputs, intermittent contacts, etc. The likelihood of a sensor failing can be indicated on the part of the manufacturer for an isolated sensor. However, this so-called inherent safety of the sensor does not meet with the demands of automotive vehicle industry.

A failure limit requirement can be estimated according to the following calculation. The estimation that 10 million vehicles are produced and supplied per year, and with an average service life of 4500 hours per vehicle, leads to a demanded failure probability of the yaw rate sensor or $10^{-7}$ approximately.

Presently, conventional yaw rate sensors for automotive vehicles do not satisfy these high demands placed on such a low failure probability. Therefore, there is a need to provide a unit for yaw rate sensor systems with a high degree of inherent safety.

BRIEF SUMMARY OF THE INVENTION

An object of the present invention is to disclose a system or device with an application that complies with the high demands described hereinabove.

This object is achieved by a system for detecting safety-critical measured quantities, in particular yaw rates and/or acceleration data in automotive vehicles, comprised of at least two independent measuring channels with sensors that are independent of one another and elements for verifying a malfunction or a failure of the measuring channels, wherein the first measuring channel and the additional measuring channel(s) are operated in hot redundancy employing sensors of similar type but not exactly identical in such a manner that the sensors are operated in parallel and without restriction.

The system of the present invention for detecting safety-critical measured quantities, in particular, yaw rates and/or acceleration data in automotive vehicles, comprises at least two independent measuring channels with sensors that are independent of one another and elements for verifying malfunction or a failure of the measuring channels.

In the system according to the present invention, the first measuring channel and the additional measuring channel(s) are operated in 'hot redundancy'. This means that sensors of similar type but not exactly identical are employed in such a way that both sensors are in operation in parallel and without restrictions, this means e.g. they have an unrestricted measuring range.

Sensors of similar type within the meaning of the present invention are e.g. those operating according to the same physical principle, such as vibration sensors having different resonance frequencies of the vibration elements or laser sensors or also those sensors of all physical types which belong to the same class of accuracy.

The sensors employed are not exactly identical according to the present invention. They differ from one another, as will be explained in detail in the following, at least in their basic vibration modes so remarkably that inductive disturbances from one sensor to the other are prevented and outside mechanical or electromechanical disturbances will not effect on the sensors in the same manner.

The term 'class of accuracy' in the sense of the present invention means that the discrepancies of the measured quantities of sensors in one class of accuracy are within a predetermined accuracy interval (deviation in percent with respect to the final value indicated in a measuring range).

The different redundancy terms used in the present invention are explained in Gellert, Kaestner, Dr. Neuber, Lexikon der Mathematik ('encyclopedia of mathematics'), II Zuverlaessig-keitstheorie ('theory of reliability'), page 470, Verlag VEB Bibliographisches Institut Leipzig, 1985, and in Helm, Dr. Prang, Lehrbuch der Automatisierungstechnik ('automatization manual'), pages 88 to 90, Zuverlaessigkeitsgroessen/Redundanz ('reliability quantities/redundancy'), Verlag VEB Technik Berlin, 1965.

The term 'redundancy' is used in connection with providing additional elements (e.g. measuring channels) in order to increase the reliability of a technical system.

'Cold redundancy' is used when the spare elements (e.g. spare channels or spare sensors) are not exposed to stress in normal operation, while 'hot redundancy' means that the spare elements in normal operation are subjected to the same stress as the working elements. Cold and hot redundancies are the borderline cases of the 'warm redundancy' where the spare elements are exposed to less stress than the working elements.

The sensors of the system, which are applicable according to the present invention, preferably refer to a first yaw rate sensor, at least one additional yaw rate sensor and, optionally, other sensors such as acceleration sensors.

Applying redundancy considerations in the field of sensors in automotive vehicles is per se known to enhance the reliability of technical systems. Thus, DE 195 25 217 A1 discloses a method and an arrangement wherein yaw rates are acquired as an input quantity of an automotive vehicle control system by using two independent measuring channels, one measuring channel thereof covering the total measuring range, while the other channel is adjusted to a partial measuring range. For error detection, the output quantities of the measuring channels are checked for coincidence of the measured quantities gathered by means of the measuring channels and/or for plausibility of the test results. In this regard, the partial measuring range is dynamically modified or used as a 'magnifying glass' in dependence on the yaw operation. In contrast to the present invention (application of the 'hot redundancy'), the method disclosed in DE 195 25 217 A1 uses a principle that corresponds to the application of a 'warm redundancy'. The reason for this is that in DE 195 25 217 A1 the extent of use of the 'hot redundancy' is limited to the partial measuring range, with the partial measuring channel being equipped with higher precision and, therefore, being used to a greater degree for measuring purposes than the second measuring channel. There is a 'cold redundancy' outside the partial measuring range because the partial measuring channel normally stays unused but is dynamically latently available. The method as disclosed by the present invention is therefore different from the method described in DE 195 25 217 A1.

In German patent application 199 21 692.4 which is not published, an arrangement for protecting electronic function units and/or function groups against disturbance variables is disclosed. In this arrangement, different shields against disturbance variables are associated with assemblies having a different sensitivity with respect to disturbance variables, and two or more shields will add to provide a shield with a higher efficiency.

In the system of the present invention, yaw rate sensors of any physical action principle, e.g. sensors, which are based on the application of laser light may be used in general. Preferably, however, the yaw rate sensors used are types where the Coriolis forces at the vibration elements which develop during the yaw movement are used to infer the yaw rate therefrom (mechanic vibration elements). Yaw rate sensors of this type are known in many fashions. Cylinders, rings, discs, prisms, tuning forks, micromechanically produced structures made of silicon or quartz are employed as vibration elements. The action principle of these sensors involves that the vibration element is excited oscillatorily to develop mechanic vibrations at a constant drive amplitude and frequency in the one direction of the element, while a mechanic vibration is simultaneously produced in another direction of element under the influence of the Coriolis force, the vibrations amplitude being proportional to the yaw rate. The vibration elements are driven to produce oscillatory vibrations by way of piezoelectric or magnetic transducer methods, and the Coriolis reaction is sampled by way of similar piezoelectric or magnetic transducer methods (pick-up). When the drive frequency of the oscillatory drive is referred to by $f_o$ and the pick-up frequency of the mechanic vibration in the direction in space of the Coriolis reaction is referred to by $f_c$, the vibration elements are designed mechanically so that there is always a resonance frequency difference $\Delta f = f_o - f_c$ between both frequencies.

The yaw rate sensors with mechanic vibration elements are preferably different from each other in that the resonance frequencies of the vibration elements are so far remote from each other that the vibrations do not mutually influence each other and externally induced vibrations will not stimulate the two yaw rate sensors at all or only slightly.

The individual frequencies $f_o$ and $f_c$ of all redundant yaw rate sensors relative to each other are then chosen so that when the sensors are jointly arranged mechanically in a housing or on a common support element, no disturbing mechanic cross couplings of vibrations of the individual sensoric vibration elements and/or electric cross couplings (e.g. frequency pulling, or due to mechanic coupling of structure-borne sound) of the oscillators or the pick-up signals will occur.

As has already been mentioned hereinabove, the total failure rate (the unreliability) is reduced to the product of the individual failure rates when 'hot redundancy' is applied (in contrast to other forms of redundancy). When the failure rate of the individual automotive vehicle yaw rate sensor is configured as being 70 FIT (which corresponds to $70 \times 10^{-9}$ failures per working hour)—a practically relevant value—, then the demanded inherent safety is reached using two yaw rate sensors of equal type according to the present invention in 'hot redundancy' at a failure probability of approximately $10^{-7}$ under the proviso of 10 million equipped vehicles with a respective service life of 4500 hours.

A sensor electronic unit is connected preferably to the sensors in the system, the output signals of the electronic unit being evaluated by electronic processing units, and further there is a connection to a communication serial interface adapter that can be connected to at least one central control.

In the electronic processing unit, the means for testing the malfunction report the result of the test by relaying an appropriate signal to the communication serial interface adapter so that a central control (ESP/ECU) connected by way of the communication serial interface can react optionally to sensor failure in the way that initially the operation of the system is continued until the automotive vehicle has resumed a reliable condition. The system can be switched off totally or partly (ball-back level concept) only then.

Fault detection is favorably executed so that the output quantities of the individual yaw rate sensors and the variation behavior of these output quantities are continuously compared to one another in a comparison unit. When the output quantities and/or their variation behavior differ from each other and/or from predetermined allowability criteria with respect to a temporarily valid limit value, the entry into a control that founds on the yaw rate sensor system is not allowed. When the system with (n) hot-redundancy channels undergoes a control operation and a total failure occurs at (n-m) channels during the control, the control will be completed with the remaining (m) channels.

In a particularly favorable manner, the frequency distances of the individual redundant sensors $\Delta f$ are chosen as follows: in case that two yaw rate sensors are employed which are comparable in their measuring range and their precision, the first sensor should have the frequencies $f_{o1}, f_{c1}$ with the frequency distance $\Delta f_1$, and the second sensor should have the frequencies $f_{o2}, f_{c2}$ with the frequency distance $\Delta f_2$. Care should be taken that the frequency distances are chosen so as to prevent equal-channel disturbances (common-mode disturbances) of any mechanical or electrical type which might take effect on both yaw rate sensors at the same time.

When the frequency distances are chosen as described above, surprisingly, external vibration influences which, during driving, act on the common sensor housing or the common support member through the chassis of the automotive vehicle will not cause failure of the yaw rate sensor system of the present invention.

The yaw rate sensors can be arranged in so-called 'hot redundancy' as a function block (module) with a common shielding housing.

Therefore, the present invention also relates to a device comprised of a sealed housing with a plug, and the arrangement described above is incorporated in the sealed housing.

It is preferred that the sensors are arranged in a shielding internal housing or cage incorporated within the housing.

Appropriately, the internal housing or the cage is not physically connected to the sealed housing.

Favorably, the yaw rate sensors are arranged on a first printed circuit board, and at least part of the electronic processing units is arranged on an additional printed circuit board.

It is expedient that the first printed circuit board is arranged inside the shielding internal housing or cage, and the additional printed circuit board is arranged outside the shielding internal housing or cage.

The shielding elements used as a protection against electrical high-frequency energy that entered prevent both or several yaw rate sensors operating at 'hot redundancy' from being affected detrimentally by this high-frequency energy at the same time. Similar shielding elements are described in P 199 21 692.4. In the prior art device, individual yaw rate sensors are encompassed by shielding cages or housings of different effects so that disturbances such as electromagnetic radiations, capacitive cross couplings, etc., act on the yaw rate sensors differently.

According to a favorable embodiment of the present invention, the yaw rate sensors are accommodated in an internal housing or cage arranged within an external housing so that the shielding effect of the external housing and the internal housing will add.

In a particularly advantageous manner, the device of the present invention represents a combination with transverse and longitudinal acceleration sensors as a small compact appliance with a CAN-bus serial interface (sensor cluster).

BRIEF DESCRIPTION OF THE DRAWINGS

FIG. 2A is a schematic view of the constructive concept of a practical embodiments.

FIG. 2B is a true-to-scale view of a practical embodiment according to FIG. 1 and FIG. 2A.

FIG. 2C is a view of the alignment of coordinates of the embodiment according to FIG. 2A and FIG. 2B with respect to the vehicle.

DETAILED DESCRIPTION OF THE PREFERRED EMBODIMENTS

Figure 1:
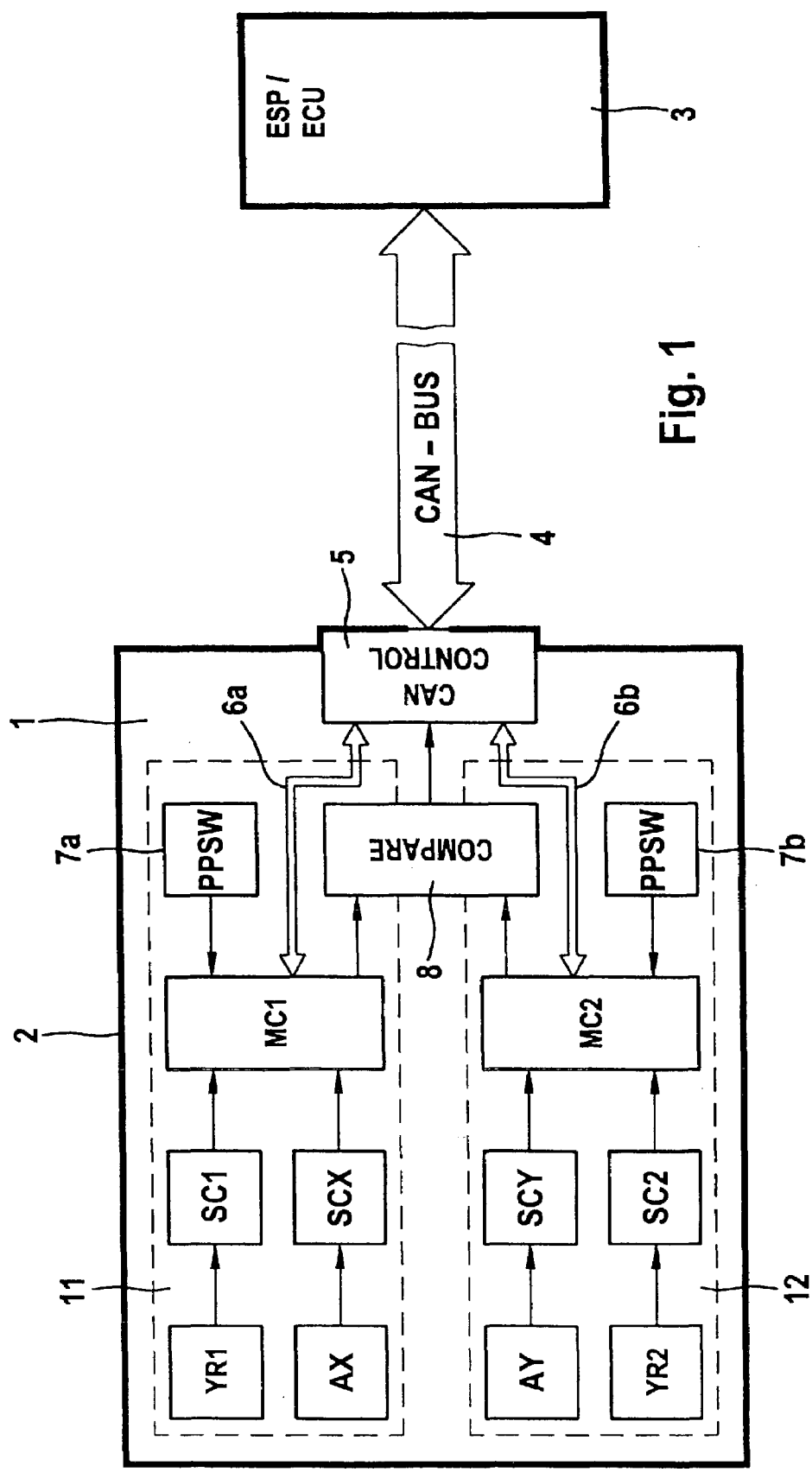
FIG. 1 is a schematic view of a system of the type of the present invention.

FIG. 1 shows a schematic view of the technical interaction of the components of a system of the type according to the present invention. The system is configured as a device 1 for the simultaneous acquisition of yaw rate, longitudinal acceleration, and transverse acceleration for ESP applications. The device has a housing 2 inside which all components are accommodated. There is a CAN-bus connection 4 between the device and the electronic controller of the ESP system 3. The CAN-bus controller 5 is a component part of the device. The system structurally comprises two independent measuring channels 11, 12. These measuring channels are in general similar sensor branches. The first measuring channel 11 is comprised of the yaw rate sensor YR1 with an associated signal conditioning circuit SC1 and the longitudinal acceleration sensor AX with an associated signal conditioning circuit SCX. The signals of these sensors are front-end processed in terms of signal technology in a first microcontroller MC1. There is a resident software PPSW 7a for this purpose, and there is the possibility of receiving additional information via the connection 6a from the ECU by way of the CAN bus. The second measuring channel 12 is comprised of the yaw rate sensor YR2 with signal conditioning circuit SC2 and the transverse acceleration sensor AY with signal conditioning circuit SCY. The signals of these sensors are front-end processed in terms of signal technology in a second microcontroller MC2. There is a resident software PPSW 7b for this purpose, and there is the possibility of receiving additional information via the connection 6b from the ECU by way of the CAN bus. The front-end processed signals are combined in a function step 8. The described redundancy tests are performed herein, and corresponding status signals are generated which signal to the ECU whether an entry into the control is temporarily admissible or whether any one of the channels suffered from a total failure during the control. The front-end processed signals YR1, YR2, AX, AY as well as the status signals of the redundancy test are transmitted cyclically to the ECU by way of the CAN bus so that it is possible to execute a second independent redundancy test in the ECU.

FIG. 2A shows a schematic view of the constructive concept of the device 1. The torsionally resistant housing 2 is made of aluminum. It has two tongues 2a, 2b for attachment to the chassis and a CAN bus plug 9. Two boards PCB1 and PCB2 are located inside. YR1 and SC1 as well as YR2 and SC1 are placed on PCB1. PCB1 is encompassed by a metal shielding cage (Faraday cage) 10 that prevents the ingress of powerful high-frequency radiation (e.g. from a mobile telephone) into the sensitive yaw rate sensor system. All other components that have been described with respect to FIG. 1 are accommodated on PCB2.

The technique of the yaw rate sensors which are preferred in application is based on micromechanical tuning forks made of quartz or micromechanically produced structures of silicon using the Coriolis effect that occurs during rotation. As disclosed in the invention, both acceleration sensors along with their signal conditioning stages form a complex unit in the form of an MEMS (Micro-Electronic-Mechanical-System). It is also within the meaning of the present invention that one yaw rate sensor and one acceleration sensor each with their specific signal conditioning stages form a complex unit in the way of an MEMS.

For an application e.g. in ESP systems, it is preferred to employ yaw rate sensors with a measuring range of +/−75°/s to +/−100°/s.

Favorably, the failure rate of the yaw rate sensors employed ranges at roughly 70 FIT at the most.

When two yaw rate sensors of similar type according to the present invention are employed (which is preferred), it is possible to select the mechanical inherent frequencies of the vibration elements as follows, for example:

Sensor 1: $f_{o1}$=12.0 kHz, $f_{c1}$=12.2 kHz, $\Delta f_1$=200 Hz
Sensor 2: $f_{o2}$=12.5 kHz, $f_{c2}$=12.6 kHz, $\Delta f_2$=100 Hz.

As acceleration sensors, it is preferred to use elements having a measuring range of roughly +/−1.5 g to roughly +/−2.0 g, with g referring to the acceleration due to gravity.

The acceleration sensors and yaw rate sensors used have preferably a signal quantization of a minimum of 10 bit approximately, with respect to signal resolution and noise behavior, in relation to a band width of 50 Hz.

The invention claimed is:

1. System for detecting safety-critical measured quantities, comprising:
    a first measuring channel including a first yaw rate sensor and a first longitudinal acceleration sensor,
    a second measuring channel including a second yaw rate sensor and a second transverse acceleration sensor,
    a first yaw rate signal conditioning circuit respectively associated with said first yaw rate sensor,
    a second yaw rate signal conditioning circuit respectively associated with said second yaw rate sensor,
    a first longitudinal acceleration signal conditioning circuit associated with said first longitudinal acceleration sensor,
    a second transverse acceleration signal conditioning circuit associated with said second transverse acceleration sensor,
    wherein the first measuring channel and the second measuring channel are operated in hot redundancy.

2. System as claimed in claim 1, wherein an output of each sensor's respectively associated signal conditioning circuit is elevated by one or more electronic processing units, and wherein said one or more electronic processing units are connected to a communication serial interface adapter.

3. System as claimed in claim 2, wherein the one or more electronic processing units further include a comparison unit which compares information carried by the output signals of said first and second yaw rate sensors and a time variation between the output signals of the first and second yaw rate sensors of the signals with one another.

4. System as claimed in claim 1, wherein the first and second yaw rate sensors each respectively include mechanical vibration elements, and wherein the first and second yaw rate sensors differ from each other such that the first and second resonance frequencies of the respective first and second mechanical vibration elements are sufficiently different from one another such that the vibrations do not mutually influence each other.

5. System as claimed in claim 4, wherein the first and second resonance frequencies are respectively defined by a difference between an oscillatory drive frequency and a pick-up frequency of a mechanic vibration in the direction in space of a Coriolis reaction.

6. System as claimed in claim 5, wherein the vibration mechanical element of the first yaw rate sensor includes an oscillatory drive frequency is approximately equal to 12.0 kHz and a pick-up frequency approximately equal to 12.2 kHz that results in a first resonant frequency approximately equal to 200 Hz, and wherein the vibration mechanical element of the second yaw rate sensor includes an oscillatory drive frequency is approximately equal to 12.5 kHz and a pick-up frequency approximately equal to 12.6 kHz that results in a second resonant frequency approximately equal to 100 hz.

7. System as claimed in claim 4, wherein the first and second resonance frequencies are respectively defined by a difference between an oscillatory drive frequency and a pick-up frequency of a mechanic vibration in the direction in space of a Coriolis reaction.

8. System as claimed in claim 7, wherein the vibration mechanical element of the first sensor includes an oscillatory drive frequency is approximately equal to 12.0 kHz and a pick-up frequency approximately equal to 12.2 kHz that results in a first resonant frequency approximately equal to 200 Hz, and wherein the vibration mechanical element of the second sensor includes an oscillatory drive frequency is approximately equal to 12.5 kHz and a pick-up frequency approximately equal to 12.6 kHz that results in a second resonant frequency approximately equal to 100 hz.
    wherein a flag (bit) (SMAL_POS_GAIN_FAILURE_SUSPICION) is set (52) when the percentage difference value exceeds a threshold value K5 (DELTA_YA>60%).

9. System as claimed in claim 1, wherein the sensors are arranged in a housing suitable for shielding them from high frequency electro-magnetic radiation.

10. System as claimed in claim 9, wherein the shielding housing is arranged within, but not physically connected to a seated enclosure.

11. System as claimed in claim 9, wherein the first and second yaw rate sensors are arranged on a first printed circuit board, and at least part of an electronic processing unit is arranged on a second printed circuit board.

12. System as claimed in claim 11, wherein the first printed circuit board is arranged inside the shielding housing, and the second printed circuit board is arranged outside the shielding housing.

13. System as claimed in claim 11, wherein the shielding housing includes plug pins which are connected to the first printed circuit board without cables.

14. System as claimed in claim 9, wherein the shielding housing is mounted within a sealed enclosure which includes mounting elements for the installation into an automotive vehicle.

* * * * *